(12) United States Patent
Lecerf et al.

(10) Patent No.: US 9,689,999 B2
(45) Date of Patent: Jun. 27, 2017

(54) SEISMIC IMAGING USING HIGHER-ORDER REFLECTIONS

(71) Applicant: PGS Geophysical AS, Oslo (NO)

(72) Inventors: Didier B. P. Lecerf, Rio de Janeiro (BR); Nizar Chemingui, Houston, TX (US); Alejandro A. Valenciano Mavilio, Bellaire, TX (US); Shaoping Lu, Houston, TX (US)

(73) Assignee: PGS Geophysical AS, Oslo (NO)

( * ) Notice: Subject to any disclaimer, the term of this patent is extended or adjusted under 35 U.S.C. 154(b) by 244 days.

(21) Appl. No.: 14/550,001

(22) Filed: Nov. 21, 2014

(65) Prior Publication Data

US 2015/0362611 A1  Dec. 17, 2015

Related U.S. Application Data

(60) Provisional application No. 62/012,138, filed on Jun. 13, 2014.

(51) Int. Cl.
*G01V 1/34* (2006.01)
*G01V 1/28* (2006.01)
*G01V 1/38* (2006.01)

(52) U.S. Cl.
CPC ........ *G01V 1/28* (2013.01); *G01V 2210/1293* (2013.01); *G01V 2210/1423* (2013.01); *G01V 2210/56* (2013.01); *G01V 2210/57* (2013.01)

(58) Field of Classification Search
CPC .. G01V 1/28; G01V 2210/57; G01V 2210/56; G01V 2210/1423; G01V 2210/1293

USPC .......................................... 367/7, 37, 15, 21
See application file for complete search history.

(56) References Cited

U.S. PATENT DOCUMENTS

| | | | |
|---|---|---|---|
| 4,937,793 | A | 6/1990 | Shuck et al. |
| 6,590,831 | B1 | 7/2003 | Bennett et al. |
| 7,359,283 | B2 | 4/2008 | Vaage et al. |
| 7,505,361 | B2 | 3/2009 | Sollner |
| 7,520,467 | B2 | 4/2009 | Gioffre et al. |
| 7,554,880 | B2 | 6/2009 | Fleming |
| 7,835,225 | B2 | 11/2010 | Söllner et al. |

(Continued)

OTHER PUBLICATIONS

Brittan et al. "Improved imaging in complex geology using separated wavefields," First Break, vol. 30, Nov. 2012, pp. 83-88.*

(Continued)

*Primary Examiner* — Daniel L Murphy

(57) ABSTRACT

Techniques are disclosed relating to geophysical analysis. In one embodiment, a method includes receiving seismic data for a geophysical formation recorded during a seismic survey using one or more seabed sensors and one or more sources. In this embodiment, the method includes determining a seismic gather for a location in the geophysical formation, modifying the seismic gather by interchanging source-receiver definitions for the seismic gather, and imaging the location using the modified gather. In this embodiment, the imaging uses higher-order reflections recorded in the seismic gather. In some embodiments, the method includes separating up-going and down-going wavefields and separately imaging using the up-going wavefield and the down-going wavefield.

16 Claims, 5 Drawing Sheets

(56) References Cited

U.S. PATENT DOCUMENTS

| | | | |
|---|---|---|---|
| 8,756,042 B2* | 6/2014 | Tan | G01V 1/282 |
| | | | 703/10 |
| 2006/0291328 A1 | 12/2006 | Robertsson et al. | |
| 2007/0064526 A1 | 3/2007 | Holo | |
| 2009/0157242 A1 | 6/2009 | Holo et al. | |
| 2010/0091610 A1 | 4/2010 | Sollner | |
| 2013/0030709 A1 | 1/2013 | Ferber | |
| 2013/0322205 A1 | 12/2013 | Widmaier et al. | |
| 2014/0198605 A1* | 7/2014 | Grion | G01V 1/308 |
| | | | 367/7 |
| 2014/0288891 A1* | 9/2014 | Pica | G01V 1/30 |
| | | | 703/1 |

OTHER PUBLICATIONS

N. D. Whitmore, et al., "Imaging of primaries and multiples using a dual-sensor towed streamer," SEG Denver 2010 Annual Meeting, downloaded Apr. 14, 2011, pp. 3187-3192.

Kees Wapenaar, et al., "Seismic interferometry by crosscorrelation and by multi-dimensional deconvolution: a systematic comparison," Geophysical Journal International, vol. 185, Jun. 2011, pp. 151-178.

J.T. Fokkema, et al., "Seismic Applications of Acoustic Reciprocity," Elsevier Science Publishers B.V., 1993, 352 pages.

Leon Knopoff, et al., "Seismic Reciprocity," Geophysics, vol. XXIV, No. 4, Oct. 1959, pp. 681-691.

Dongliang Zhang, "Reverse Time Migration of Multiples for OBS Data," SEG Denver 2014 Annual Meeting, pp. 4077-4081.

Shaoping Lu, et al., "Imaging of Primaries and Multiples with 3D SEAM Synthetic," SEG San Antonio 2011 Annual Meeting, pp. 3217-3221. [Downloaded Feb. 6, 2012].

N. D. Whitmore, et al., "Imaging of Primaries and Multiples with Image Space Surface Related Multiple Elimination," G005, 73rd EAGE Conference & Exhibition incorporating SPE EUROPEC 2011, Vienna, Austria, May 23-26, 2011, 5 pages.

Search Report in United Kingdom Patent Application No. 1510102.5 dated Dec. 2, 2015, 1 page.

Wong, et al., "Imaging with least multiples using least-squares reverse time migration," The Leading Edge, Sep. 2014, pp. 970-976.

Wong, et al., "Least-squares reverse time migration/inversion for ocean bottom: a case study," SEG San Antonio Annual Meeting. Sep. 18-23, 2011, pp. 2369-2373.

Zhang, et al., "Least-squares reverse time migration of multiples," Geophysics, vol. 79. No. 1, Jan.-Feb. 2014, pp. S11-S21.

Zhang, et al., "Reverse Time Migration of Multiples for OBS Data," SEG Denver 2014 Annual Meeting, Oct. 26-31, 2014, pp. 4077-4081.

* cited by examiner ific surveys. Seismic geophysical surveys, for example, are based on the use of acoustic waves. In some seismic surveys, a survey vessel may tow an acoustic source (e.g., an air gun or a marine vibrator) and a plurality of streamers along which a number of acoustic sensors (e.g., hydrophones and/or geophones) are located. In other surveys, acoustic sensors are located on the seabed rather than being towed. This may be desirable in situations in which floating infrastructure prevents a streamer vessel from surveying an area, when wide-azimuth illumination is needed, and/or when imaging using shear-wave data is desired, for example.

SEISMIC IMAGING USING HIGHER-ORDER REFLECTIONS

This application claims the benefit of U.S. Provisional Application No. 62/012,138, filed on Jun. 13, 2014, which is incorporated by reference herein in its entirety.

BACKGROUND

Geophysical surveys are often used for oil and gas exploration in geophysical formations, which may be located below marine environments. Various types of signal sources and geophysical sensors may be used in different types of geophysical surveys. Seismic geophysical surveys, for example, are based on the use of acoustic waves. In some seismic surveys, a survey vessel may tow an acoustic source (e.g., an air gun or a marine vibrator) and a plurality of streamers along which a number of acoustic sensors (e.g., hydrophones and/or geophones) are located. In other surveys, acoustic sensors are located on the seabed rather than being towed. This may be desirable in situations in which floating infrastructure prevents a streamer vessel from surveying an area, when wide-azimuth illumination is needed, and/or when imaging using shear-wave data is desired, for example.

Acoustic waves generated by the survey source may be transmitted to the earth's crust and then reflected back and captured at the towed and/or seabed geophysical sensors. Data collected during a marine geophysical survey may be analyzed to locate hydrocarbon-bearing geological structures, and thus determine where deposits of oil and natural gas may be located.

Four-dimensional (4D) surveying involves surveying the same geophysical formation at different points in time, e.g., to determine changes in fluid saturation, pressure, etc. over time. Seabed sensors may advantageously reduce variations between surveys, allowing high repeatability for 4D surveying (e.g., because receivers are fixed). However, it may be difficult and/or expensive to deploy and maintain large numbers of seabed sensors, so survey techniques using relatively sparse sensor arrays may be desirable.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112(f) for that unit/circuit/component.

DETAILED DESCRIPTION

Figure 1:
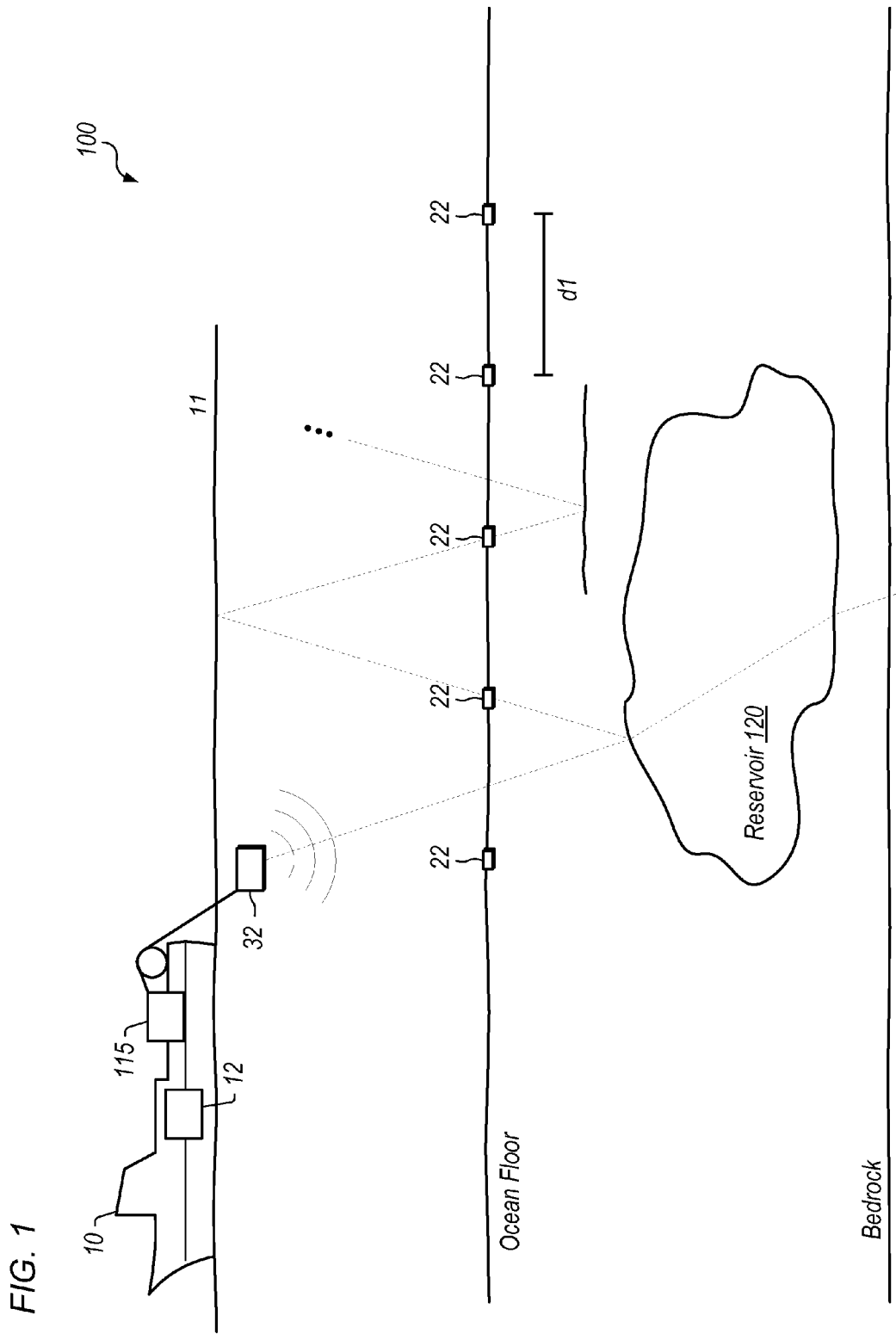
FIG. 1 is a block diagram illustrating one embodiment of a geophysical survey system.

This disclosure initially describes, with reference to FIG. 1, an overview of a geophysical survey system. It then describes exemplary seismic traces with reference to FIGS. 2-3. Exemplary geophysical analysis techniques for seismic imaging are described with reference to FIGS. 4-5. The geophysical analysis techniques may include: switching source and receiver definition based on reciprocity, using higher-order reflections, separating up-going and down-going wavefields, deconvolution, cross-correlation and/or other techniques. In some embodiments, the disclosed techniques may reduce processing time, increase illumination area, allow sparse sensor arrays, increase survey flexibility, and/or reduce noise sources for 4D surveys.

Survey System Overview

Referring to FIG. 1, a diagram illustrating one embodiment of a geophysical survey system 100 is shown. In the illustrated embodiment, system 100 includes survey vessel 10, signal source 32, and geophysical sensors 22.

Survey vessel 10 may be configured to move along the surface of body of water 11 such as a lake or the ocean, as shown. In the illustrated embodiment, signal source 32 is configured to transmit an acoustic signal. The illustrated dashed line shows a direction of travel for a portion of an acoustic wave-front generated by signal source 32. In the illustrated embodiment, the acoustic signal proceeds through the ocean floor and is reflected by reservoir 120, the ocean surface (an air/water interface), and a reflector located above reservoir 120.

Survey vessel 10 may include equipment, shown generally at 12 and for convenience collectively referred to as "survey equipment." Survey equipment 12 may include devices such as a data recording unit (not shown separately) for making a record with respect to time of signals generated by various geophysical sensors in the system 100. Survey equipment 12 may also include navigation equipment (not shown separately), which may be configured to control, determine, and record, at selected times, the geodetic positions of: survey vessel 10, signal source 32, and/or other survey elements. Geodetic position may be determined using various devices, including global navigation satellite systems such as the global positioning system (GPS), for example. In some embodiments, vessel 10 is configured to tow one or more seismic streamers (not shown).

In the geophysical survey system 100 shown in FIG. 1, survey vessel 10 tows a single signal source 32. In various embodiments, survey vessel 10 may tow any appropriate number of signal sources, including as few as none or as many as 6 or more. The location of the signal sources may be centered behind survey vessel 10 or displaced from the center line, and may be at various distances relative to survey vessel 10, including attached to the hull. Signal sources may be any type of signal source known in the art. Signal source 32 may include an array of multiple signal sources. For example, signal source 32 may include a plurality of seismic sources (e.g., air guns) or EM sources. The term "signal source" may refer to a single signal source or to an array of signal sources. In the illustrated embodiment, signal sources 32 are each coupled to survey vessel 10 at one end through winch 115 or a similar spooling device that enables changing the deployed length of a signal source cable. Survey equipment 12 may include signal source control equipment (not shown separately) for selectively operating and maneuvering signal source 32.

Geophysical sensors 22 may be referred to as seabed sensors and may be any type of geophysical sensor known in the art. Examples include hydrophones and/or geophones in some embodiments. Non-limiting examples of such geophysical sensors may include particle motion responsive seismic sensors such as geophones and accelerometers, pressure responsive seismic sensors such as hydrophones, pressure-time-gradient responsive seismic sensors, electrodes, magnetometers, temperature sensors or combinations of the foregoing. In various implementations of the disclosure, geophysical sensors 22 may measure, for example, seismic or electromagnetic field energy indicative of the response of various structures in the Earth's subsurface formation below the bottom of body of water 11 to energy imparted into the subsurface formation by one or more of signal source 32. Seismic energy, for example, may originate from signal source 32, or an array of such signal sources, deployed in body of water 11 and towed by survey vessel 10.

In some embodiments, geophysical sensors 22 (which may also be referred to as receivers) are configured to store data until they are physically retrieved, at which point the stored data may be accessed. In other embodiments, geophysical sensors 22 may be configured to communicate with survey equipment onshore or in survey vessel wirelessly or using transmission cables, in various embodiments. Geophysical sensors 22 may include relatively stable and/or synchronized clocks to timestamp recorded data. Geophysical sensors 22 may be comprised in ocean bottom cables (OBC) and linked together or may be ocean bottom nodes (OBN/OBS) and be individual recording systems (e.g., with a clock, battery, sensor, and data/time recorder integrated within each unit). In the illustrated embodiment, two of geophysical sensors 22 are located distance dl apart. In some embodiments, the disclosed geophysical analysis techniques may allow sparse deployment of geophysical sensors 22, e.g., with separation between sensors of 300 meters or more.

Survey equipment 12, in one embodiment, includes a computing system (not shown separately) configured to, inter alia, process data from geophysical sensors 22. In other embodiments, a computing system at another location may perform geophysical analysis on data gathered by geophysical survey system 100 (e.g., on land after a survey has been conducted). A computing system may include or be configured to access a non-transitory storage medium having instructions stored thereon that are executable to cause the system to perform various operations described herein. A computing system may include one or more processors configured to execute the program instructions.

Overview of Reflected Signals

FIGS. 2A-2D show examples of seismic signals received by a seabed geophysical sensor. As shown, the signals are generated by a source 220 and arrive at a seabed sensor 210 located on the ocean floor. Acoustic signals propagating up toward the ocean surface are referred to as "up-going" wavefields while signals propagating down toward the ocean floor are referred to as "down-going" wavefields. A particular seismic trace/signal may be reflected multiple times and thus be up-going and down-going at different times during travel. However, a given signal is typically referred to as up-going or down-going based on whether it is up-going/down-going when arriving at a receiver. Note that typically, the air/water interface reflects an acoustic wave with a reflection coefficient close to minus one. Thus, the interface behaves like a mirror with a polarity change and small energy loss. As used herein, the term "seabed sensor" refers to a geophysical sensor that is positioned on, buried in, or otherwise attached to the seafloor (e.g., rather than being included in a streamer towed by a survey vessel). In some embodiments, such as geostreamers, the sensors themselves are not in contact with the seafloor but are maintained at a fixed position above the seafloor.

Figure 2A:
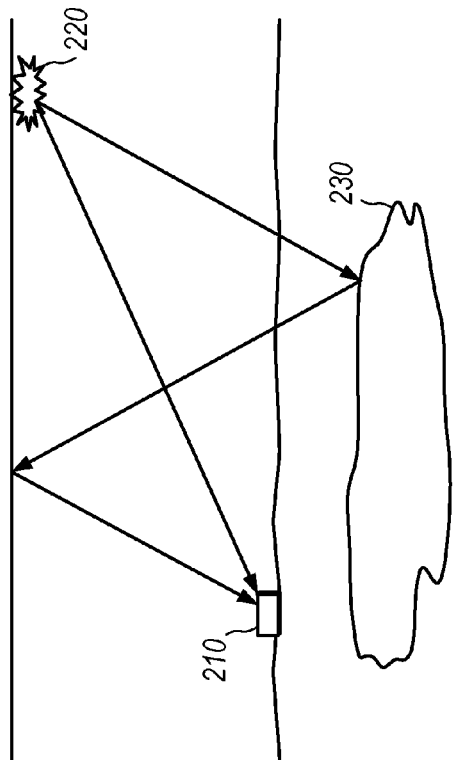
FIGS. 2A-2D are diagrams that illustrate exemplary seismic traces.

In the example of FIG. 2A, sensor 210 receives both a direct signal (from source 220 to receiver 210) and a primary reflection. As used herein, a "primary" reflection refers to a signal reflected by a location in a geophysical formation that is being imaged, and not reflected by other geophysical layers or the air/water interface. Traditionally, primary reflections have been used for imaging geophysical formations while other reflections have been removed from survey data before imaging, using various de-multiple techniques.

Figure 2B:
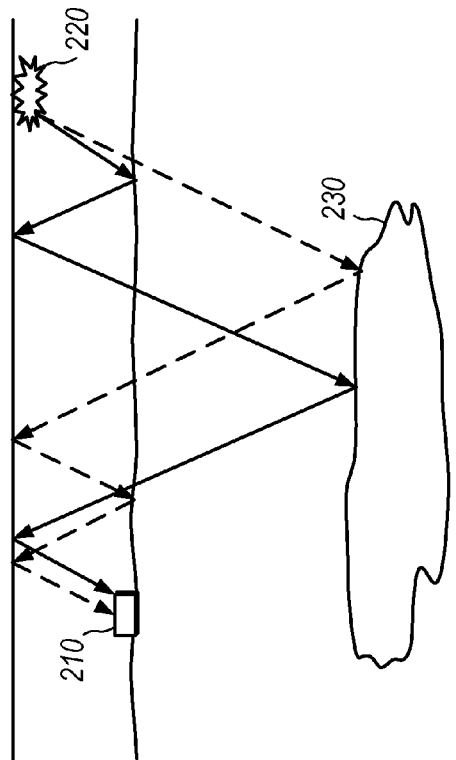

In the example of FIG. 2B, sensor 210 receives both a direct signal and a mirrored signal reflected from both geophysical formation 230 and the ocean surface. Imaging using such a mirrored signal (a down-going signal reflected once by the air/water interface before arriving at a sensor) may be referred to as "mirror imaging." In the illustrated example, the signal reflected from the air-water interface may be referred to as a receiver-side peg leg (a signal reflected from the air/water interface or a geophysical layer other than the location being imaged), which is received as a down-going signal in the illustrated example. Mirror imaging may allow imaging of locations other than a midpoint between source and receiver, as shown in FIG. 2B, in which a location that reflects the signal in geophysical formation 230 is located closer to source 220 than a midpoint between source 220 and sensor 210.

Figure 2C:
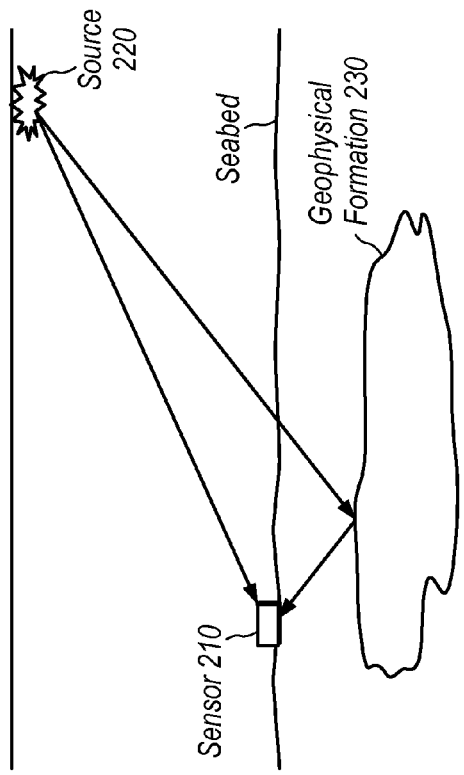
Figure 2D:
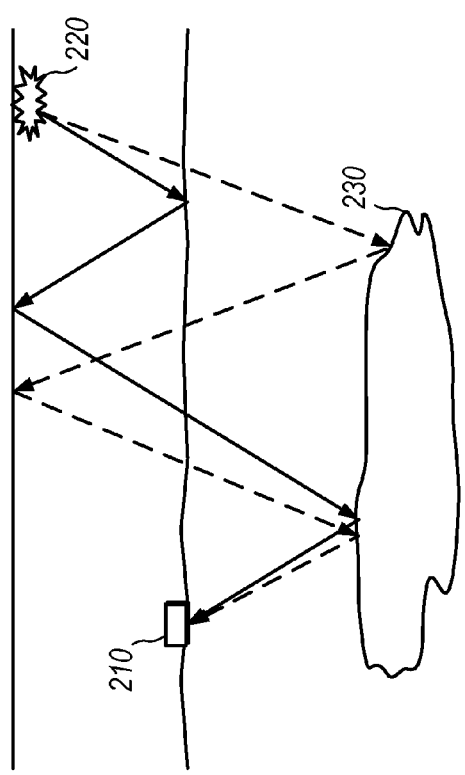

In the examples of FIGS. 2C and 2D, sensor 210 receives higher-order reflections in up-going and down-going wavefields respectively. As used herein "higher-order" reflections refer to up-going signals reflected at least once by an air/water interface or down-going signals reflected at least twice by the air-water interface. Thus, primary reflections and reflections used in mirror imaging are not higher-order reflections.

In FIG. 2C, the solid line illustrates a signal that includes a source-side peg leg. In FIG. 2D, the solid line indicates a signal that includes both source and receiver-side peg legs, while the dashed line indicates a signal that includes a receiver-side peg leg.

As mentioned above, in traditional imaging techniques, various de-multiple algorithms may be used to remove higher-order reflections from survey data before imaging a geophysical formation. However, in various embodiments described herein, one or more types of higher-order multiples/reflections are not removed from survey data and are processed during imaging. Geophysical analysis using higher-order multiples may allow for a greater survey illumination area (greater coverage of the geophysical formation). For example, a primary reflection typically provides data only for a location at a midpoint between a source and receiver. However, higher-order multiples may include data for points much nearer to the source, increasing illumination area based on source coverage.

Wavefield Separation Overview

In various embodiments, up-going and down-going wavefields may be separated before imaging and/or other geophysical analysis. Typically, wavefield separation is performed based on data from multiple types of sensors. For example, pressure sensors (e.g., hydrophones) that measure pressure (P) as a scalar and particle-velocity sensors (e.g., geophones) that measure particle velocity (Z) as a vector are used in some embodiments. In these embodiments, a given seabed sensor 210 may include both pressure and particle-velocity sensors. Because the up-going wavefield is in-phase for both pressure and particle-velocity records, it may be extracted by summing the two measurements (PZ-summation) after calibration while the down-going wavefield is canceled because it is out-of-phase on P compared to Z. Similarly, the down-going wavefield may be extracted by determining the difference between the P and calibrated Z.

Traditional geophysical analysis for seabed sensors uses only the up-going wavefield, e.g., because it contains less sea-surface reflections (the down-going wavefield includes air/water surface reflected waves by definition). However, using the down-going wavefield as well may improve illumination of the water bottom and shallow structures. Thus mirror imaging uses the down-going wavefield and primary signal reflected once by the air/water interface. In various embodiments, higher-order reflections are used in imaging based on both up-going and down-going wavefields.

Separately processing up-going and down-going wavefields may have various advantages over geophysical analysis without separation, such as reduced imaging noise due to cross-talk (e.g., constructive interference of some artefacts). The PZ-summation used to generate the up-going wavefield may also remove some receiver-side peg legs. However, in some embodiments, wavefield separation is not performed. This may allow use of single-component sensors, e.g., hydrophones rather than multi-component sensors, which may reduce sensor cost.

Reciprocity Overview

FIGS. 3A-3D show examples of survey traces used to image location 350 and application of the reciprocity theorem, according to some embodiments. Sources 320 may be different seismic source modules or may represent different shot locations for a given source module. In some embodiments, sensor 310 is configured similarly to sensor 210, as described above with reference to FIGS. 2A-2D. As shown, the signals in FIGS. 3A and 3B include receiver-side peg legs.

The reciprocity theorem states that, under certain conditions, the interchange of seismic source and receiver yields identical displacement fields. For example, consider equation (1) for the vertical component of particle velocity:

$$v(t, x_s, x_r) = R(t, x_r) * G(t, x_s, x_r) * S(t, x_s) \qquad (1)$$

where $x_s$ and $x_r$ are source and receiver positions respectively, R is the receiver response for vertical component recordings, S is the source signature, and G is Green's function (e.g., the corresponding medium response), and the asterisk (*) denotes convolution in the time domain. For equation (1), reciprocity of the medium response may be expressed using equation (2):

$$G(t, x_s, x_r) = G(t, x_r, x_s) \qquad (2)$$

Equations (1) and (2) are provided as non-limiting examples. In various embodiments, reciprocity may be applied to any of various other appropriate equations for seismic wave propagation, e.g., for pressure and/or particle velocity measurements.

Figure 3A:
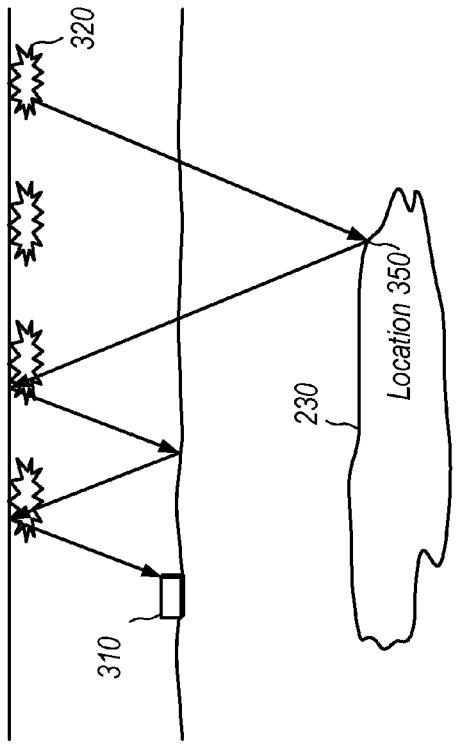
FIGS. 3A-3B illustrate exemplary seismic traces and FIGS. 3C-3D illustrate interchange of source and receiver definitions, according to one embodiment.
Figure 3B:
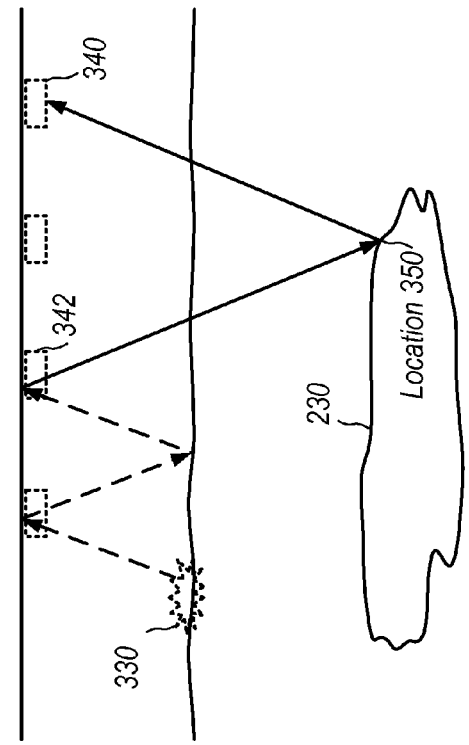
Figure 3C:
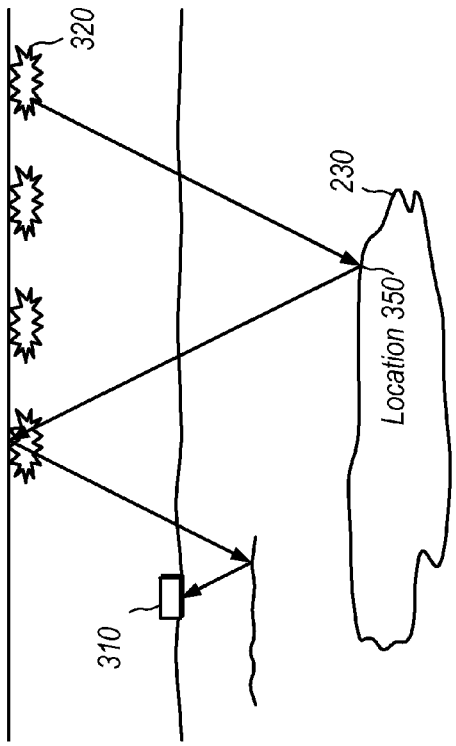
Figure 3D:
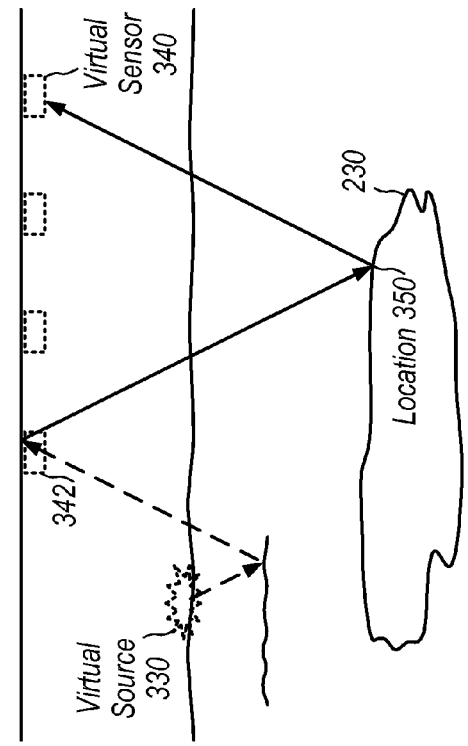

In the illustrated example, the traces shown in FIGS. 3A and 3B may be part of seismic gathers for location 350. In the illustrated embodiment, the seismic gathers are modified for at least the illustrated traces (of FIGS. 3A and 3B) by interchanging source and sensor definition, such that the resulting gathers include data representing signals generated using a virtual source 330 and captured using one or more of virtual receivers 340 (as shown in FIGS. 3C and 3D). In this embodiment, time propagation may become negative based on the interchange of source/receiver definition.

As used herein, source and receiver/sensor "definitions" refer to data that indicates at least position information for a source or receiver/sensor. Source and receiver definitions may also include other information about sources or receivers/sensors such as source signature information, for example. Thus, inverting or interchanging source and sensor definition for a particular source/sensor pair may result in data representing a signal generated by virtual source at the position of the sensor (which may have one or more attributes of the original source such as signature, etc.) and received by a virtual sensor at a position of the source (which may in turn have one or more attributes of the original sensor).

As used herein, a seismic "gather" refers to a set of one or more seismic traces that share a common attribute. Examples include common shot gathers, common receiver gathers, common midpoint gathers, common depth point gathers, etc. Determining a seismic gather for a particular location in a geophysical formation involves determining a set of one or more traces reflected from the location.

Exemplary Imaging Techniques Using Higher-Order Multiples and Reciprocity

Still referring to FIGS. 3C and 3D, in some embodiments, deconvolution or cross-correlation is used to image location 350 using data representing one or more of the exemplary traces/signals shown (e.g., after inverting source-sensor definition).

In one embodiment, in order to image location 350, a geophysical analysis system is configured to deconvolve two sets of data to image location 350. Referring to FIG. 3C, in this embodiment, the first data represents the signal originating from virtual source 330 and arriving at virtual sensor 340 (shown using both the dashed and solid lines in FIG. 3C). In this embodiment, the second data represents the signal originating from virtual source 330 and arriving at virtual sensor 342 (shown using the dashed lines in FIG. 3C). This deconvolution may be similar to imaging using a source-receiver pair located at the positions of virtual sensors 342 and 340.

In these embodiments, a similar deconvolution may be performed for the signals in FIG. 3D (e.g., deconvolving data representing the complete signal, including both dashed and solid traces, with data representing the dashed traces). Speaking generally, in some embodiments, deconvolution is performed for two sets of data. In these embodiments, the first data represents a signal initiated from a virtual source (e.g., virtual source 330), reflected one or more times before being reflected at a first virtual receiver (e.g., virtual sensor 342), reflected by the location in the geophysical formation (e.g., location 350), and arriving at a second virtual receiver (e.g., virtual sensor 340). In these embodiments, the second data represents a signal initiated from the virtual source and reflected one or more times before arriving at the first virtual receiver. Note that, in some embodiments, the position of virtual sensor 342 may not correspond to the actual position of a physical source during a survey. Rather, in various embodiments, signal corrections and/or interpolations may be used to generate data corresponding to virtual sources and/or receivers at various positions.

In other embodiments, geophysical analysis equipment is configured to perform cross-correlation in order to image location 350. In this embodiment, the crosscorrelation of first data representing a signal received at virtual sensor 342 and second data representing a signal received at virtual sensor 340 may provide the medium response (e.g., Green's function) of location 350, similar to imaging using a source-receiver pair located at the positions of virtual sensors 342 and 340.

The geophysical analysis techniques described herein may provide various advantages over conventional imaging techniques. These advantages may reduce equipment costs, reduce survey time, reduce processing time, and/or improve survey accuracy, resulting in competitive advantages in the geophysical surveying industry.

As a first example, imaging using higher-order multiples may reduce processing time for geophysical analysis because it avoids the need for de-multiple algorithms, which can be complex and use significant processing time.

Further, imaging using higher-order multiples increases illumination area, in some embodiments. Each order of multiple/reflection for a given wave front has different reflection points, allowing imaging of locations that may be unreachable using traditional imaging (e.g., using only primaries and/or mirror imaging).

Still further, using reciprocity means that the illumination area may be defined by the surface distributions of the survey source(s) and the maximum order of multiples recorded. Thus, the illumination area may be increased, in some embodiments, by increasing the coverage of the survey source(s) and/or increasing sensor recording time to record additional multiple arrivals. This may allow for flexibility in sensor geometry and survey planning. For example, sparse arrays of seabed sensors may be used because of the increased illumination area and ability to manipulate the illumination area by changing source coverage. In these embodiments, seabed sensors in a sparse array may be located 300 meters or more apart, for example. In various embodiments, sensor deployment, sensor geometry, survey procedures, etc. may be determined based on the disclosed geophysical analysis techniques. Further, steering the seismic source allows flexibility in generating virtual sensors to control the illumination area while the virtual sources remain stationary. This may allow increased survey repeatability, which is important for 4D surveys.

Still further, imaging using reciprocity and deconvolution may avoid any need to perform de-signature processing for the source. The source term may be reduced because the wavefields share the same convolutive source signature. The source signal may be zero-phased and any bubble effect may be cancelled in the imaging output. This may also allow increased survey repeatability, e.g., for 4D surveys.

Still further, separately imaging up-going and down-going wavefields may attenuate uncorrelated cross-talk artifacts. Also, various sources of noise in 4D surveys (e.g., source depth, bubble fluctuations, phase rotation, receiver coupling, etc.) may be canceled out by the disclosed techniques.

Figure 4:
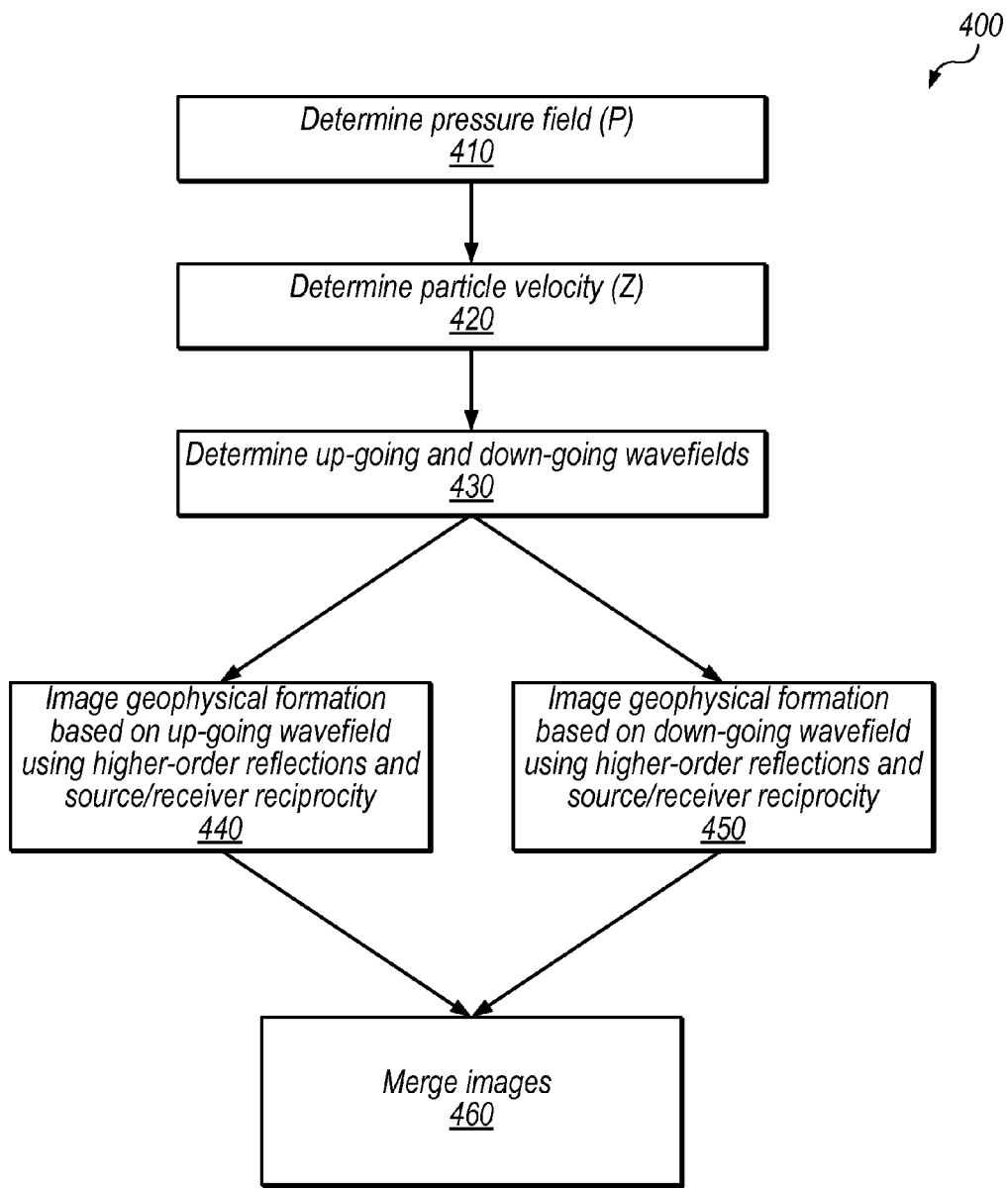
FIG. 4 illustrates one embodiment of a method for seismic imaging that includes separating up-going and down-going wavefields.

Referring now to FIG. 4, a flow diagram illustrating one embodiment of a method for seismic imaging is shown. The method shown in FIG. 4 may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired. Flow begins at block 410.

At block 410, a pressure field P is determined. In some embodiments, a computing system is configured to determine the pressure field based on measurement data from one or more pressure sensors generated during a seismic survey. In various embodiments, the pressure field is based on reflections of seismic waves from a geophysical formation. Flow proceeds to block 420.

At block 420, particle velocity data is determined. In some embodiments, velocity is derived from recorded acceleration data and/or change in pressure data is derived from recorded pressure information in order to process data from pressure sensors and particle velocity sensors in the same mode (e.g., velocity and pressure or acceleration and change in pressure). In some embodiments, a computing system is configured to determine the particle velocity data based on received measurement data, where the measurement data was previously generated during the seismic survey. In other embodiments, the determining of blocks 410 and 420 includes performing the seismic survey to generate pressure field and particle velocity data. Flow proceeds to block 430.

At block 430, up-going and down-going wavefields are separated, e.g., by computing the summation and difference between the P and Z fields, as discussed above. Flow proceeds in parallel to blocks 440 and 450.

At block 440, the geophysical formation is imaged based on data for the up-going wavefield, using higher-order reflections and source/receiver reciprocity, e.g., as described above with reference to FIGS. 3C and 3D. Flow proceeds to block 460.

At block 450, the geophysical formation is imaged based on data for the down-going wavefield, using higher-order reflections and source/receiver reciprocity, e.g., as described above with reference to FIGS. 3C and 3D. Flow proceeds to block 460.

At block 460, the images generated in blocks 440 and 450 are merged to generate a final image of the geophysical formation. The merging may include averaging the two images, for example. In other embodiments, any of various appropriate techniques including various weightings may be used to combine the images. Flow ends at block 460.

Figure 5:
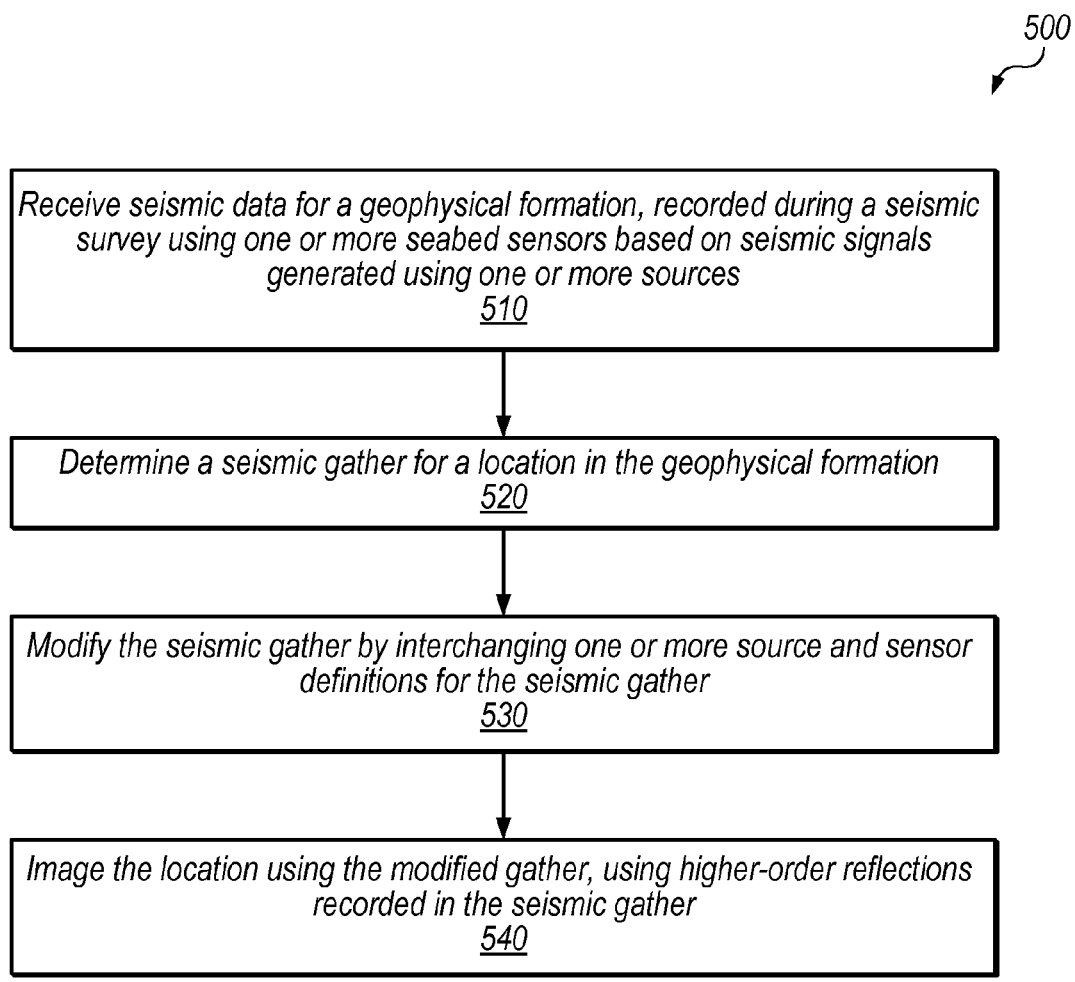
FIG. 5 illustrates one embodiment of a method for seismic imaging that includes interchanging source-receiver definition and using higher-order multiples.

Referring now to FIG. 5, a flow diagram illustrating one embodiment of a method for seismic geophysical analysis is shown. The method shown in FIG. 5 may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired. Flow begins at block 510.

At block 510, seismic data for a geophysical formation is received. In this embodiment, the seismic data is generated during a seismic survey using one or more seabed sensors based on seismic signals generated using one or more sources. The seismic data may be retrieved from the seabed sensors using any of various appropriate techniques. Flow proceeds to block 520.

At block 520, a seismic gather is determined for a location in the geophysical formation. In some embodiments, the seismic gather includes data for a plurality of reflections from the location. In some embodiments, the seismic gather includes data from a plurality of seabed sensors and/or generated based on signals from a plurality of source locations. In some embodiments, the seismic gather includes data representing higher-order reflections for the location. In some embodiments, the seismic gather does not include a primary reflection for the location in the geophysical formation. In some embodiments, gathers are generated for various locations in the geophysical formation, e.g., in order to image the entire geophysical formation. Thus, the disclosed techniques may be used for a plurality of locations in the geophysical formation, in some embodiments. Flow proceeds to block 530.

At block 530, the seismic gather is modified by interchanging one or more source and sensor definitions for the seismic gather. For example, in some embodiments, the interchange generates data representing a signal generated by a virtual source located at a position of one of the seabed sensors and received by a virtual sensor located at a position of one of the one or more sources. Exemplary embodiments of interchanging source-receiver definition are described above, with reference to FIGS. 3C and 3D. Flow proceeds to block 540.

At block 540, the location is imaged using the modified gather, using higher-order reflections recorded in the seismic gather. The imaging may include determining the impulse response of the geophysical formation at the location. Imaging using higher-order reflections may increase illumination area, facilitating surveys using sparse arrays of seabed sensors, in some embodiments. Inverting source-receiver definition may facilitate imaging of locations located nearer to a source than to a sensor, using higher-order multiples, in some embodiments. Flow ends at block 540.

In some embodiments, the method of FIG. 5 is utilized to perform the operations of blocks 440 and 450 of FIG. 4 to generate separate images of the geophysical formation based on up-going and down-going wavefields.

Exemplary Survey and Survey Planning Techniques

In some embodiments, the pattern of an array of seabed sensors for a survey may be determined in advance in order to generate data usable to perform the disclosed geophysical analysis techniques. The pattern may specify distances between sensors, sensor orientation, shot area, etc. For example, the disclosed techniques may allow a sparse recording array, with distances of 300-400 meters or more between adjacent sensors. Conventional OBC acquisition may utilize 50 or 100 meter receiver distances along the cables and cables may be spaced at 100, 200 meters, etc. In various embodiments, these distances may be increased using the disclosed techniques, using separations of 300-400 meters, for example, between adjacent sensors on the same cable and/or between adjacent sensors on different cables. Typically OBN sensors are deployed on a regular and homogeneous square or hexagonal grid (e.g., 200×200 meters, 300×300 meters, etc., in some embodiments). The disclosed techniques may allow increased distances between individual OBN sensors (e.g., distances of 400 meters or more between adjacent sensors, in some embodiments).

In some embodiments, various survey actions may be taken in order to generate data for the disclosed geophysical analysis techniques. For example, one or more sources may be steered to generate a desired defined illumination area, using higher-order multiples. As another example, receiver acquisition times and parameters may be configured, e.g., in order to record long enough to capture higher-order multiples for desired locations in a geophysical formation. Receiver positions, survey design, survey geometry, source parameters, etc. may be defined, in some embodiments, to optimize illumination associated with higher-order reflections.

U.S. patent application Ser. No. 13/485,552, filed May 31, 2012 and titled "Seismic Surveying Techniques with Illumination Areas Identifiable from Primary and Higher-Order Reflections" is incorporated by reference herein. If there is any contradiction in terms between the '552 application and the present disclosure, definitions in the present disclosure control. The '552 application describes various surveying designs, geometries, and techniques for towed sensor streamers using higher-order reflections. These techniques may be modified for use with seabed sensors in combination with various techniques disclosed herein. Further, various embodiments herein are described in the context of seabed sensors. In other embodiments, the disclosed techniques may be used for towed streamers or any other appropriate types of sensors in addition to and/or in place of seabed sensors.

Exemplary embodiments include: a method, including deploying a sparse pattern of seabed sensors for a seismic survey of a geophysical formation, wherein the sparse pattern includes at least 300 meters between respective sensors; and generating, using the sparse pattern of seabed sensors and one or more seismic sources, a geophysical data product for the geophysical formation. In this embodiment, the geophysical data product is usable to perform operations that include: determining a seismic gather for a location in the geophysical formation, wherein the seismic gather includes one or more source definitions and one or more sensor definitions, modifying the seismic gather by interchanging one or more source and sensor definitions for the seismic gather, and imaging the location using the modified gather, wherein the imaging uses higher-order reflections recorded in the seismic gather.

In one embodiment, the method further comprises steering the one or more sources to cover a desired illumination area that includes the location in the geophysical formation.

In one embodiment, the method further comprises setting a measurement interval for one or more sensors of the sparse pattern of seabed sensors for a shot by the one or more sources, wherein the measurement interval is sufficient in length to receive a desired order of higher-order reflections, from the location in the geophysical formation, at the one or more of the sparse pattern of seabed sensors.

In some embodiments, a geophysical data product may be produced. The geophysical data product may include processed geophysical data and may be stored on a non-transitory, tangible computer-readable medium. The geophysical data product may be produced offshore (i.e. by equipment on a survey vessel) or onshore (i.e. at a facility on land) either within the United States or in another country. If the geophysical data product is produced offshore or in another country, it may be imported onshore (e.g., to a facility in the United States). Geophysical analysis may be performed on the data product either offshore or onshore. The geophysical analysis may determine various characteristics of the geophysical formation which may be useful for location and/or extraction of mineral deposits.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
   accessing, by a computing system, seismic data for a geophysical formation, wherein the seismic data is recorded during a seismic survey using one or more seabed sensors based on seismic signals generated using one or more sources;
   separating, by the computing system, up-going and down-going wavefields based on the seismic data;
   performing separately, by the computing system, for the up-going wavefield and the down-going wavefield:
      determining a seismic gather for a location in the geophysical formation using the seismic data, wherein the seismic gather includes one or more source definitions and one or more sensor definitions;
      modifying the seismic gather by interchanging one or more source and sensor definitions for the seismic gather; and
      imaging the location using the modified gather, wherein the imaging uses higher-order reflections recorded in the seismic gather; and
   combining, by the computing system, an output of the imaging of the geophysical formation generated based on the up-going wavefield with an output of the imaging of the geophysical formation generated based on the down-going wavefield to generate an output image.

2. The method of claim 1, wherein the modifying produces data for the modified gather representing a signal transmitted from a virtual source located at a position of one of the one or more seabed sensors and received by a virtual receiver located at a position of one of the one or more sources.

3. The method of claim 1, wherein the higher-order reflections include at least one of:
   a signal that is up-going when received by one of the seabed sensors, wherein the signal is reflected at the location in the geophysical formation and also reflected by an air/water interface; and
   a signal that is down-going when received by one of the seabed sensors, wherein the signal is reflected at least twice by the air/water interface.

4. The method of claim 1,
   wherein the imaging includes deconvolving first data with second data;
   wherein the first data represents a signal initiated from a virtual source, reflected one or more times before being reflected at a first virtual receiver, reflected by the location in the geophysical formation, and arriving at a second virtual receiver;
   wherein the second data represents a signal initiated from the virtual source and reflected one or more times before arriving at the first virtual receiver; and
   wherein a position of the second virtual receiver corresponds to a position of one of the one or more sources and wherein a position of the virtual source corresponds to a position of one of the one or more sensors.

5. The method of claim 1,
   wherein the imaging includes cross-correlating first data representing a signal received at a first virtual receiver with second data representing a signal reflected from the location and received at a second virtual receiver; and
   wherein positions of the first and second virtual receivers correspond to positions of the one or more sources.

6. The method of claim 1, wherein the one or more seabed sensors include a plurality of seabed sensors, wherein each of the one or more seabed sensors is located at least 300 meters from each of the other ones of the one or more seabed sensors.

7. The method of claim 1,
   wherein the seismic gather includes data for a higher-order reflection generated by one of the one or more sources at a first position and received by one of the one or more sensors at a second position;
   wherein the location in the geophysical formation is at least 75 meters, in an in-line direction, from a midpoint between the first position and the second position; and
   wherein the location in the geophysical formation is nearer to the first position than to the second position.

8. The method of claim 1, further comprising:
   generating the seismic data for the geophysical formation by performing the seismic survey.

9. The method of claim 1, further comprising:
   repeating, by the computing system, the determining, modifying, and imaging for second seismic data;
   wherein the seismic data is obtained during a first time portion of a four dimensional (4D) survey of the geophysical formation and wherein the second seismic data is obtained during a second portion of the 4D survey of the geophysical formation.

10. A system, comprising:
    one or more processors; and
    one or more memories having program instructions stored thereon that are executable by the one or more processors to perform operations comprising:
       receiving seismic data for a geophysical formation, wherein the seismic data is recorded during a seismic survey using a plurality of seabed sensors based on seismic signals generated by one or more sources;
       separating up-going and down-going wavefields based on the seismic data;
       performing separately for the up-going wavefield and the down-going wavefield:
          determining a seismic gather for a location in the geophysical formation, wherein the seismic gather includes:
             data representing a higher-order reflection of a first signal generated by a first source of the one or more sources and received by a first sensor of the plurality of seabed sensors; and
             a definition for the first source and a definition for the first sensor, wherein the definitions indicate respective positions of the first source and first sensor for the first signal;
          modifying the seismic gather by inverting the definition for the first source and the definition for the first sensor for the first signal; and
          imaging the location using the modified gather and the data representing the higher-order reflection; and
       combining an output of the imaging of the geophysical formation generated based on the up-going wavefield with an output of the imaging of the geophysical formation generated based on the down-going wavefield to generate an output image.

11. The system of claim 10, wherein the imaging includes deconvolving the first signal with a second signal.

12. The system of claim 10, wherein the plurality of seabed sensors are each located at least 300 meters from each of the other ones of the plurality of seabed sensors.

13. A non-transitory computer-readable medium having instructions stored thereon that are executable by a computing device to perform operations comprising:
receiving seismic data for a geophysical formation, wherein the seismic data is recorded during a seismic survey using a plurality of seabed sensors based on seismic signals generated by one or more sources;
separating up-going and down-going wavefields based on the seismic data;
performing separately for the up-going wavefield and the down-going wavefield:
determining a seismic gather for a location in the geophysical formation, wherein the seismic gather includes one or more source definitions and one or more sensor definitions;
modifying the seismic gather by inverting one or more source and sensor definitions for the seismic gather; and
imaging the location using the modified gather, wherein the imaging uses higher-order reflections recorded in the seismic gather; and
combining an output of the imaging of the geophysical formation generated based on the up-going wavefield with an output of the imaging of the geophysical formation generated based on the down-going wavefield to generate an output image.

14. The non-transitory computer-readable medium of claim 13, wherein the higher-order reflections include at least one of:
a signal that is up-going when received by one of the seabed sensors, wherein the signal is reflected at the location in the geophysical formation and also reflected by an air/water interface; and
a signal that is down-going when received by one of the seabed sensors, wherein the signal is reflected at least twice by the air/water interface.

15. The non-transitory computer-readable medium of claim 13,
wherein the imaging includes deconvolving first data with second data;
wherein the first data represents a signal initiated from a virtual source, reflected one or more times before being reflected at a first virtual receiver, reflected by the location in the geophysical formation, and arriving at a second virtual receiver;
wherein the second data represents a signal initiated from the virtual source and reflected one or more times before arriving at the first virtual receiver; and
wherein a position of the second virtual receiver corresponds to a position of one of the one or more sources and wherein a position of the virtual source corresponds to a position of one of the one or more sensors.

16. The non-transitory computer-readable medium of claim 13, wherein the operations further comprise:
repeating the determining, modifying, and imaging for second seismic data;
wherein the seismic data is obtained during a first time portion of a four dimensional (4D) survey of the geophysical formation and wherein the second seismic data is obtained during a second portion of the 4D survey of the geophysical formation.

* * * * *